United States Patent
Oladeji et al.

(10) Patent No.: US 11,894,547 B2
(45) Date of Patent: Feb. 6, 2024

(54) MULTIFUNCTIONAL ENGINEERED PARTICLE FOR A SECONDARY BATTERY AND METHOD OF MANUFACTURING THE SAME

(71) Applicant: ULVAC Technologies, Inc., Methuen, MA (US)

(72) Inventors: Isaiah O. Oladeji, Gotha, FL (US); Akiyoshi Suzuki, Kanagawa (JP); Koukou Suu, Methuen, MA (US)

(73) Assignees: ULVAC TECHNOLOGIES, INC., Methuen, MA (US); SISOM THIN FILMS LLC, Orlando, FL (US)

( * ) Notice: Subject to any disclaimer, the term of this patent is extended or adjusted under 35 U.S.C. 154(b) by 205 days.

(21) Appl. No.: 17/066,130

(22) Filed: Oct. 8, 2020

(65) Prior Publication Data
US 2021/0104738 A1    Apr. 8, 2021

Related U.S. Application Data

(60) Provisional application No. 63/086,400, filed on Oct. 1, 2020, provisional application No. 63/101,243, filed on Oct. 8, 2019.

(51) Int. Cl.
*H01M 4/36*    (2006.01)
*H01M 4/52*    (2010.01)
(Continued)

(52) U.S. Cl.
CPC ......... *H01M 4/366* (2013.01); *H01M 4/0404* (2013.01); *H01M 4/0435* (2013.01);
(Continued)

(58) Field of Classification Search
CPC ........ H01M 4/36; H01M 4/525; H01M 4/505; H01M 4/04; H01M 4/587
See application file for complete search history.

(56) References Cited

U.S. PATENT DOCUMENTS 8,349,498 B2    1/2013    Oladeji
8,372,163 B2    2/2013    Oladeji
(Continued)

FOREIGN PATENT DOCUMENTS

JP    2018-198131 A    12/2018

OTHER PUBLICATIONS

"From Gems to Lithium Battery Electrodes: The Significance of the Diamond, Ruby (Sapphire), Spinel and Peridot Structures", Thackeray, Argonne National Laboratory, 10th International Meeting on Lithium Batteries, Como, Italy, May 28-Jun. 2, 2000.*
(Continued)

*Primary Examiner* — Kenneth J Douyette
(74) *Attorney, Agent, or Firm* — Wilmer Cutler Pickering Hale and Dorr LLP

(57) ABSTRACT

An engineered particle for an energy storage device, the engineered particle includes an active material particle, capable of storing alkali ions, comprising an outer surface, a conductive coating disposed on the outer surface of the active material particle, the conductive coating comprising a $M_xAl_ySi_zO_w$ film; and at least one carbon particle disposed within the conductive coating. For the $M_xAl_ySi_zO_w$ film, M is an alkali selected from the group consisting of Na and Li, and $1 \leq x \leq 4$, $0 \leq y \leq 1$, $1 \leq z \leq 2$, and $3 \leq w \leq 6$.

33 Claims, 10 Drawing Sheets

(51) Int. Cl.
*H01M 4/50* (2010.01)
*H01M 4/04* (2006.01)
*H01M 4/58* (2010.01)
*H01M 10/0525* (2010.01)
*H01M 4/525* (2010.01)
*H01M 4/505* (2010.01)
*H01M 4/587* (2010.01)
*H01M 4/583* (2010.01)
*H01M 4/62* (2006.01)
*H01M 4/66* (2006.01)
*H01M 4/74* (2006.01)
*H01M 4/02* (2006.01)

(52) U.S. Cl.
CPC ......... *H01M 4/0471* (2013.01); *H01M 4/505* (2013.01); *H01M 4/525* (2013.01); *H01M 4/583* (2013.01); *H01M 4/587* (2013.01); *H01M 4/5825* (2013.01); *H01M 4/623* (2013.01); *H01M 4/662* (2013.01); *H01M 4/74* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2010/0221613 A1 | 9/2010 | Ueki et al. |
| 2010/0230632 A1* | 9/2010 | Adamson ............ H01M 6/16 252/182.1 |
| 2011/0215280 A1* | 9/2011 | Obrovac ............ H01M 4/62 252/521.2 |
| 2014/0346618 A1* | 11/2014 | Lahlouh ............ H01M 4/0402 438/49 |
| 2016/0049646 A1 | 2/2016 | Fujiki et al. |
| 2016/0308217 A1 | 10/2016 | Liu et al. |
| 2017/0133711 A1 | 5/2017 | Gaben |
| 2018/0175390 A1* | 6/2018 | Sun ............ H01M 4/386 |
| 2018/0212233 A1 | 7/2018 | Ito et al. |

OTHER PUBLICATIONS

Sakuda et al., "All-solid-state lithium secondary batteries using LiCoO2 particles with pulsed laser deposition coatings of Li2S—P2S5 solid electrolytes," Journal of Power Sources vol. 196, Issue 16, Aug. 15, 2011, pp. 6735-6741 (7 pages).

Sakuda, et al., "Modification of Interface Between LiCoO2 Electrode and Li2S—P2S5 Solid Electrolyte Using Li2O—SiO2 Glassy Layers," J. Electrochem. Soc. 2009 156(1): A27-A32 (6 pages).

Yamamoto, et al., "Binder-free sheet-type all-solid-state batteries with enhanced rate capabilities and high energy densities," Scientific Reports, 8:1212, Jan. 19, 2018 (10 pages).

Cho, et al., "Novel LiCoO2 Cathode Material with Al2O3 Coating for a Li Ion Cell," Chem. Mater., Nov. 28, 2000, 12, pp. 3788-3791 (4 pages).

Xu, et al., "Lithium metal anodes for rechargeable batteries," Energy & Environmental Science, © The Royal Society of Chemistry, 2014, 7, pp. 513-537 (25 pages).

International Search Report and Written Opinion dated Feb. 17, 2021 received in related PCT/US20/54798 filed Oct. 8, 2020 (11 pages).

* cited by examiner

Cu mesh current collector, 310

Li laminated Cu mesh, 320

Li anode post porous engineered particles film deposition by spray technique, 340

MULTIFUNCTIONAL ENGINEERED PARTICLE FOR A SECONDARY BATTERY AND METHOD OF MANUFACTURING THE SAME

CROSS-REFERENCE TO RELATED APPLICATIONS

This patent application claims priority to U.S. Provisional Patent Application No. 63/086,400, filed Oct. 1, 2020, and U.S. Provisional Patent Application No. 63/101,243 (formerly U.S. patent application Ser. No. 16/596,681), filed on Oct. 8, 2019, each of which is hereby incorporated by reference herein in its entirety.

INCORPORATION BY REFERENCE

All patents, patent applications and publications cited herein are hereby incorporated by reference in their entirety for all purposes in order to more fully describe the state of the art as known to those skilled therein and to enable those skilled therein to understand the present disclosure.

TECHNICAL FIELD

This technology relates generally to secondary batteries or energy storage devices, and more specifically to a multifunctional engineered particle for use in secondary batteries or energy storage devices.

BACKGROUND

Alkali ion batteries are commonly used in portable electronic devices, electronic vehicles, and other applications. In general, alkali ion batteries operate by moving alkali ions, such as sodium and lithium, from a negative electrode to a positive electrode during discharge and then back to the negative electrode during charging. As the applications for alkali ion and other batteries grow, there is a continuing need for improved batteries with characteristics such as improved storage capacity.

SUMMARY

According to an exemplary embodiment, an engineered particle for an energy storage device includes an active material particle including an outer surface, a conductive coating disposed on the outer surface of the active material particle, the conductive coating including a $Li_xAl_ySi_zO_w$ film, and at least one carbon particle disposed within the conductive coating. For the $Li_xAl_ySi_zO_w$ film, $1 \le x \le 4$, $0 \le y \le 1$, $1 \le z \le 2$, and $3 \le w \le 6$.

According to some aspects, the $Li_xAl_ySi_zO_w$ film is characterized by a lithium ion conductivity of about $10^{-5}$ S/cm. According to some aspects, the $Li_xAl_ySi_zO_w$ film is amorphous.

According to some aspects, the active material particle has a size within a range of about 0.01 μm to about 50 μm.

According to some aspects, the active material particle includes a lithium intercalating material, or a material capable of storing lithium. According to some aspects, the lithium intercalating material is $LiCoO_2$, $LiNiCoAlO_2$, $LiNiMnCoO_2$, $LiFePO_4$, $LiMnO_2$, $SnO_2$, $Li_4Ti_5O_{12}$, $SiO_2$, sulfur, graphite, or activated carbon.

According to some aspects, the active material particle includes a non-lithium intercalating material.

According to some aspects, the active material particle includes a sodium intercalating material. According to some aspects, the sodium intercalating material is $NaCoO_2$, $NaNiCoAlO_2$, $NaNiMnCoO_2$, $NaFePO_4$, $NaMnO_2$, $Na_4Ti_5O_{12}$, sulfur, graphite, or activated carbon.

According to some aspects, the active material particle includes an intercalating material that does not have an initial sodium or lithium content. According to some aspects, the intercalating material is graphite, activated carbon, sulfur, $SiO_2$, or $SnO_2$.

According to an exemplary embodiment, a secondary battery includes a cathode, an anode, and an electrolyte. At least one of the at least one of the cathode and the anode includes an engineered particle. The engineered particle includes an active material particle including an outer surface. A conductive coating is disposed on the outer surface of the active material particle, the coating including a $M_xAl_ySi_zO_w$ film and at least one particle selected from the group consisting of a carbon particle, a graphene particle, and a carbon nanotube particle, and at least one particle disposed within the conductive coating. In some embodiments, M is an alkali metal selected from sodium and lithium. In some embodiments, with Li-intercalating active materials, the conductive coating includes $Li_xAl_ySi_zO_w$ film, $1 \le x \le 4$, $0 \le y \le 1$, $1 \le z \le 2$, and $3 \le w \le 6$. In some embodiments, with Na-intercalating active materials, the conductive coating includes $Na_xAl_ySi_zO_w$ film, $1 \le x \le 4$, $0 \le y \le 1$, $1 \le z \le 2$, and $3 \le w \le 6$.

According to some aspects, the $Li_xAl_ySi_zO_w$ film is characterized by a lithium ion conductivity of about $10^{-5}$ S/cm. According to some aspects, the $Li_xAl_ySi_zO_w$ film is amorphous.

According to some aspects, the active material particle has a size within a range of about 0.01 μm to about 50 μm.

According to some aspects, the active material particle includes a lithium intercalating material. According to some aspects, the lithium intercalating material is $LiCoO_2$, $LiNiCoAlO_2$, $LiNiMnCoO_2$, $LiFePO_4$, $LiMnO_2$, $SnO_2$, $Li_4Ti_5O_{12}$, $SiO_2$, sulfur, graphite, graphene oxide, or activated carbon.

According to some aspects, the active material particle includes a non-lithium intercalating material.

According to some aspects, the active material particle includes a sodium intercalating material. According to some aspects, the sodium intercalating material is $NaCoO_2$, $NaNiCoAlO_2$, $NaNiMnCoO_2$, $NaFePO_4$, $NaMnO_2$, $Na_4Ti_5O_{12}$, sulfur, graphite, graphene oxide, or activated carbon.

According to some aspects, the active material particle includes an intercalating material that does not have an initial sodium or lithium content. According to some aspects, the intercalating material is graphite, activated carbon, sulfur, graphene oxide, $SiO_2$, $SnO_2$.

According to an exemplary embodiment, a method of manufacturing an engineered particle for a secondary battery includes the steps of providing one or more active material particles into a solution, each of the one or more active material particles having a predetermined size; forming a slurry of the solution and the one or more active material particles; introducing a silicate into the slurry; sonicating the slurry to produce a gel; forming dry green coated particles from the gel; and heat treating the dry green coated particles.

According to some aspects of the method, the step of heat treating includes curing at a curing temperature of about 300° C. and annealing at an annealing temperature within a range of 400 to 600° C. in the presence of an ambient gas.

These and other aspects and embodiments of the disclosure are illustrated and described below.

According to an exemplary embodiment, an engineered particle for a secondary battery, the engineered particle includes an active material particle including an outer surface; a conductive coating disposed on the outer surface of the active material particle, the conductive coating including a $M_xAl_ySi_zO_w$ film; and at least one carbon particle disposed within the conductive coating, wherein M is an alkali selected from the group consisting of Na and Li, and $1 \leq x \leq 4$, $0 \leq y \leq 1$, $1 \leq z \leq 2$, and $3 \leq w \leq 6$.

According to some aspects, the alkali is Na.

According to some aspects, the $M_xAl_ySi_zO_w$ film has an alkali ion conductivity of about $10^{-5}$ S/cm.

According to some aspects, the $M_xAl_ySi_zO_w$ film is amorphous.

According to some aspects, the active material particle has a size within a range of about 0.01 μm to about 50 μm.

According to some aspects, the active material particle includes at least one material selected from the group consisting of a lithium intercalating particle and a sodium intercalating particle.

According to some aspects, the active material particle includes at least one material selected from the group consisting of a lithium intercalating material selected from the group consisting of $LiCoO_2$, $LiNiCoAlO_2$, $LiNiMnCoO_2$, $LiFePO_4$, $LiMnO_2$, $SnO_2$, $Li_4Ti_5O_{12}$, graphite, $SiO_2$, sulfur, graphene oxide and activated carbon; and a sodium intercalating material selected from the group consisting of $NaCoO_2$, $NaNiCoAlO_2$, $NaNiMnCoO_2$, $NaFePO_4$, $NaMnO_2$, $Na_4Ti_5O_{12}$, sulfur, graphite, graphene oxide, and activated carbon.

According to some aspects, the active material particle includes an alkali storing material selected from the group consisting of a non-sodium containing material and a non-lithium containing material.

According to some aspects, the alkali storing material is graphite, sulfur, activated carbon, graphene oxide, $SiO_2$, or $SnO_2$.

According to an exemplary embodiment, a secondary battery includes a cathode; an anode; and an electrolyte, wherein at least one of the cathode and the anode includes an engineered particle, the engineered particle including an active material particle including an outer surface, wherein a conductive coating is disposed on the outer surface of the active material particle, the coating including a $M_xAl_ySi_zO_w$ film and at least one particle selected from the group consisting of a carbon particle, a graphene particle, and a carbon nanotube particle, the at least one particle disposed within the conductive coating, and wherein M is an alkali selected from the group consisting of Na and Li, and $1 \leq x \leq 4$, $0 \leq y \leq 1$, $1 \leq z \leq 2$, and $3 \leq w \leq 6$.

According to some aspects, the alkali is Na.

According to some aspects, the $M_xAl_ySi_zO_w$ film is characterized by an alkali ion conductivity of about $10^{-5}$ S/cm.

According to some aspects, the $M_xAl_ySi_zO_w$ film is amorphous.

According to some aspects, the active material particle has a size within a range of about 0.01 μm to about 50 μm.

According to some aspects, the active material particle includes at least one material selected from the group consisting of a lithium intercalating particle and a sodium intercalating particle.

According to some aspects, the active material particle includes at least one material selected from the group consisting of: a lithium intercalating material selected from the group consisting of $LiCoO_2$, $LiNiCoAlO_2$, $LiNiMnCoO_2$, $LiFePO_4$, $LiMnO_2$, $SnO_2$, $Li_4Ti_5O_{12}$, graphite, $SiO_2$, sulfur, graphene oxide, and activated carbon; and a sodium intercalating material selected from the group consisting of $NaCoO_2$, $NaNiCoAlO_2$, $NaNiMnCoO_2$, $NaFePO_4$, $NaMnO_2$, $Na_4Ti_5O_{12}$, sulfur, graphite, graphene oxide, and activated carbon.

According to some aspects, the active material particle includes a non-sodium containing or a non-lithium containing material.

According to some aspects, the non-sodium or non-lithium containing material is graphite, sulfur, activated carbon, graphene oxide, $SiO_2$, or $SnO_2$.

According to an exemplary embodiment, a method of fabricating a cathode for an alkali-ion battery, includes the steps of forming coated particles by a) forming particles of an alkali-intercalating material; mixing said particles of the alkali-intercalating material with an aqueous solution including an aluminum salt and an alkali metal salt to form a first slurry; adding a water-soluble alkali silicate into said first slurry; adding electrically-conductive carbon nanoparticles into said first slurry; sonicating said first slurry to produce a gel; drying said first slurry to form individual dry green coated gel particles; and heat treating said green coated gel particles to produce coated particles including said particles of the alkali-intercalating material, a conductive coating including an alkali aluminosilicate, and carbon nanoparticles disposed within the conductive coating; b) blending said coated particles with conductive particles, an organic binder, and at least one non-aqueous solvent to form a second slurry; c) applying a coating of said second slurry to a metal substrate with said substrate heated between 80 and 200° C. in air; d) calendaring said coated substrate at 10 tons or greater; e) curing the coated substrate in nitrogen at 250 to 400° C.

According to some aspects, said alkali-intercalating material includes at least one material selected from the group consisting of: a lithium intercalating material selected from the group consisting of $LiCoO_2$, $LiNiCoAlO_2$, $LiNiMnCoO_2$, $LiFePO_4$, $LiMnO_2$, $SnO_2$, $Li_4Ti_5O_{12}$, graphite, $SiO_2$, sulfur, graphene oxide, and activated carbon; and a sodium intercalating material selected from the group consisting of $NaCoO_2$, $NaNiCoAlO_2$, $NaNiMnCoO_2$, $NaFePO_4$, $NaMnO_2$, $Na_4Ti_5O_{12}$, sulfur, graphite, graphene oxide, and activated carbon.

According to some aspects, said conductive coating includes a $M_xAl_ySi_zO_w$ film and at least one particulate material selected from the group consisting of: a carbon particle, a graphene particle, and a carbon nanotube particle, said particulate material disposed within the conductive coating, and wherein M is an alkali selected from the group consisting of Na and Li, and $1 \leq x \leq 4$, $0 \leq y \leq 1$, $1 \leq z \leq 2$, and $3 \leq w \leq 6$.

According to some aspects, said aqueous solution includes $Al(NO_3)_3$ and at least one salt selected from the group consisting of $LiNO_3$ and $NaNO_3$.

According to some aspects, said water-soluble alkali silicate is selected from the group consisting of a lithium silicate solution and a sodium silicate solution.

According to some aspects, said electrically-conductive carbon nanoparticles are selected from the group consisting of carbon black, graphene, carbon nanotubes, and combinations thereof.

According to some aspects, said step of heat treating said green coated particles includes curing at about 300° C. followed by annealing at 400 to 600° C. in an atmosphere selected from the group consisting of nitrogen, argon gas, and combinations thereof.

According to some aspects, said second slurry includes about 90% coated particle, 5% conductive carbon particles, and 5% PVDF by weight on a solids basis combined with at least 12 mL of said at least one non-aqueous solvent per 2 g of solids.

According to some aspects, said second slurry is formed by first dissolving PVDF in 12 mL of tetrahydrofuran per 1 g of PDVF, then blending with said coated particles and said conductive particles, and adding at least 12 mL of said at least one non-aqueous solvent per 2 g of total solids.

According to some aspects, said at least one non-aqueous solvent is selected from the group consisting of methoxy propanol, N-methyl pyrrolidone, dimethylformamide, and dimethyl sulfoxide.

According to some aspects, applying said coating includes a slot coating method.

According to some aspects, applying said coating includes a spray coating method and said second slurry includes 25 to 50 mL of at least one non-aqueous solvent per 2 g of solids.

According to some aspects, calendaring the coated substrate includes calendaring said coated substrate at 24 tons or more.

According to some aspects, calendaring the coated substrate includes calendaring said coated substrate at 10-100 tons.

According to some aspects, curing the coated substrate includes curing the coated substrate in nitrogen at 300° C.

According to some aspects, curing the coated substrate includes curing the coated substrate for 10 to 30 minutes.

According to an exemplary embodiment, an alkali-ion energy storage device includes a cathode; an anode; a separator; and, an aqueous electrolyte, wherein at least one of said cathode and said anode includes an engineered particle, said engineered particle including an alkali-intercalating material particle including an outer surface, wherein a conductive coating is disposed on the outer surface of said alkali-intercalating material particle, the conductive coating including a $M_xAl_ySi_zO_w$ film and at least one particulate material selected from the group consisting of a carbon particle, a graphene particle, and a carbon nanotube particle, said particulate material disposed within the conductive coating, and wherein M is an alkali selected from the group consisting of Na and Li, $1 \leq x \leq 4$, $0 \leq y \leq 1$, $1 \leq z \leq 2$, and $3 \leq w \leq 6$.

According to some aspects, the active material particle includes at least one material selected from the group consisting of a lithium intercalating particle and a sodium intercalating particle.

According to some aspects, said alkali-intercalating material includes at least one material selected from the group consisting of lithium intercalating materials selected from the group consisting of: $LiCoO_2$, $LiNiCoAlO_2$, $LiNiMnCoO_2$, $LiFePO_4$, $LiMnO_2$, $SnO_2$, $Li_4Ti_5O_{12}$, graphite, $SiO_2$, sulfur, graphene oxide, and activated carbon; and sodium intercalating materials selected from the group consisting of: $NaCoO_2$, $NaNiCoAlO_2$, $NaNiMnCoO_2$, $NaFePO_4$, $NaMnO_2$, $Na_4Ti_5O_{12}$, sulfur, graphite, graphene oxide, and activated carbon.

According to some aspects, said cathode includes a first particulate material selected from the group consisting of $NaMnO_2$ and $LiMnO_2$; a second particulate material selected from the group consisting of conductive carbon particles and carbon nanotubes; and, PVDF binder; wherein said anode includes a third particulate material selected from the group consisting of graphite, activated carbon, graphene, graphene oxide, conductive carbon particles, and carbon nanotubes; and, PVDF binder; wherein said separator includes a cotton cloth; and wherein said aqueous electrolyte includes a solution of at least one species selected from the group consisting of $LiNO_3$, $Li_2SO_4$, $NaNO_3$, and $Na_2SO_4$.

According to some aspects, said $M_xAl_ySi_zO_w$ film has an alkali M ion conductivity of about 10-5 S/cm.

According to some aspects, said $M_xAl_ySi_zO_w$ film is amorphous.

According to some aspects, said alkali-intercalating material includes particles with a size within a range of about 0.01 µm to about 50 µm.

According to some aspects, said device includes a battery.

According to some aspects, said device includes a capacitor.

According to an exemplary embodiment, an alkali-ion energy storage device includes a cathode; an anode; a separator; and an non-aqueous electrolyte, wherein at least one of said cathode and said anode includes an engineered particle, said engineered particle including an alkali-intercalating material particle including an outer surface, wherein a conductive coating is disposed on the outer surface of said alkali-intercalating material particle, the conductive coating including a $M_xAl_ySi_zO_w$ film and at least one particulate material selected from the group consisting of a carbon particle, a graphene particle, and a carbon nanotube particle, said particulate material disposed within the conductive coating, and wherein M is an alkali selected from the group consisting of Na and Li, and $1 \leq x \leq 4$, $0 \leq y \leq 1$, $1 \leq z \leq 2$, and $3 \leq w \leq 6$.

According to some aspects, the active material particle includes at least one material selected from the group consisting of a lithium intercalating particle and a sodium intercalating particle.

According to some aspects, said alkali-intercalating material includes at least one material selected from the group consisting of: lithium intercalating materials selected from the group consisting of: $LiCoO_2$, $LiNiCoAlO_2$, $LiNiMnCoO_2$, $LiFePO_4$, $LiMnO_2$, $SnO_2$, $Li_4Ti_5O_{12}$, graphite, $SiO_2$, sulfur, graphene oxide and activated carbon, and sodium intercalating materials selected from the group consisting of: $NaCoO_2$, $NaNiCoAlO_2$, $NaNiMnCoO_2$, $NaFePO_4$, $NaMnO_2$, or $Na_4Ti_5O_{12}$, sulfur, graphite, activated carbon, and graphene oxide.

According to some aspects, said cathode includes a first particulate material selected from the group consisting of: $LiNiMnCoO_2$ and $NaFePO_4$; a second particulate material selected from the group consisting of: conductive carbon particles and carbon nanotubes; and, PVDF binder; wherein said anode includes a third particulate material selected from the group consisting of: graphite, conductive carbon particles, activated carbon, graphene, graphene oxide, and carbon nanotubes; and, PVDF binder; or Li or Na foil protected by particulate material selected from $SnO_2$, $Li_4Ti_5O_{12}$, graphite, or $SiO_2$, wherein said separator includes a porous polymeric membrane; and, wherein said non-aqueous electrolyte comprises from the group consisting of $LiPF_6$ dissolved in ethyl carbonate/ethyl methyl carbonate, $NaPF_6$ dissolved in ethyl carbonate/ethyl methyl carbonate, LiFSI dissolved in ethyl carbonate/ethyl methyl carbonate, NaFSI dissolved in ethyl carbonate/ethyl methyl carbonate, and ionic liquids.

According to some aspects, said $M_xAl_ySi_zO_w$ film has an alkali ion conductivity of about $10^{-5}$ S/cm.

According to some aspects, said $M_xAl_ySi_zO_w$ film is amorphous.

According to some aspects, said alkali-intercalating material includes particles with a size within a range of about 0.01 µm to about 50 µm.

According to some aspects, said device includes a battery.

According to some aspects, said device includes a capacitor.

According to an exemplary embodiment, a method for making a stabilized Li anode for high energy density Li batteries includes the steps of a) forming coated particles by forming particles of an lithium-intercalating material; mixing said particles of the alkali-intercalating material with an aqueous solution including an aluminum salt and an lithium metal salt to form a first slurry; adding a water-soluble lithium silicate into said first slurry; adding electrically-conductive carbon nanoparticles into said first slurry; sonicating said first slurry to produce a gel; drying said first slurry to form individual dry green coated gel particles; and heat treating said green coated gel particles to produce coated particles including said particles of the lithium-intercalating material, a conductive coating including a lithium aluminosilicate, and carbon nanoparticles disposed within the conductive coating; b) providing a metal current collector; c) coating said metal current collector with Li metal; d) spray coating said Li-coated metal current collector with a second slurry containing said coated particles, a non-aqueous solvent, and conductive particles; and e) curing said spray-coated metal current collector at 100 to 300° C.

According to some aspects, said metal current collector is selected from the group consisting of a foil or a mesh.

According to some aspects, said metal current collector is selected from the group consisting of copper, nickel, and stainless steel.

According to some aspects, coating said metal current collector includes evaporation of Li metal onto said metal current collector.

According to some aspects, said metal current collector is 10 to 100 μm thick, and said evaporated Li is 5 to 50 μm thick.

According to some aspects, coating said metal current collector includes laminating said metal current collector with Li metal foil.

According to some aspects, said metal current collector is 10 to 100 μm thick, and said Li foil is 5 to 50 μm thick.

According to some aspects, said non-aqueous solvent is selected from the group consisting of hexane, toluene, and benzene.

According to some aspects, said conductive particles include conductive carbon.

According to some aspects, said second slurry further includes particles selected from the group consisting of engineered $SnO_2$ particles, engineered $Li_4Ti_5O_{12}$ particles, engineered graphene oxide, and engineered $SiO_2$ particles.

BRIEF DESCRIPTION OF THE DRAWINGS

The exemplary embodiments are described with reference to the following figures, which are presented for the purpose of illustration only and are not intended to be limiting.

In the Drawings.

DETAILED DESCRIPTION

Figure 1:
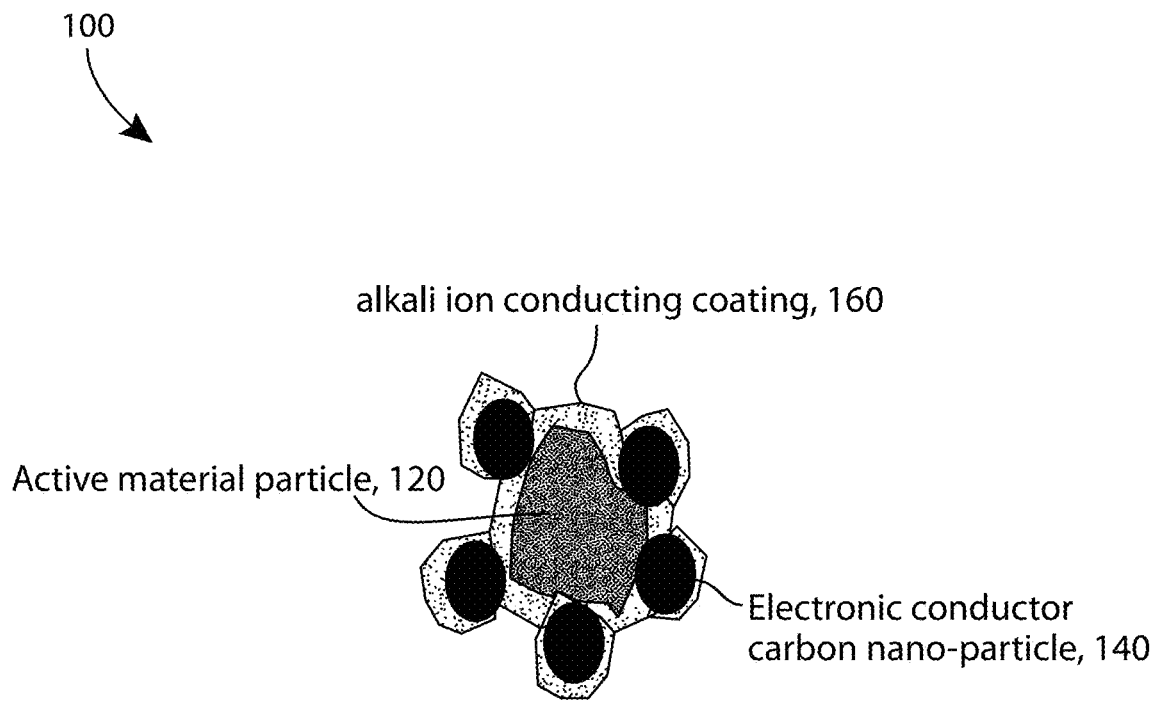
FIG. 1 is a schematic representation of an engineered particle according to an illustrative embodiment.

According to an aspect of the disclosure, disclosed herein are illustrative embodiments of an engineered particle and an energy storage device performance enhancer. In some embodiments, such particles are suitable for use in secondary batteries. Also disclosed here are methods of manufacturing or fabricating the same according to exemplary embodiments. The engineered particle according to an exemplary embodiment is useable in a wide range of applications (for example, different types of secondary batteries or different applications within a same secondary battery). It should be understood that the present disclosure is not limited to the details or methodology set forth in the description or illustrated in the figures. It should also be understood that the terminology used herein is for the purpose of description only and should not be regarded as limiting.

One challenge with designing secondary batteries or energy storage devices that use active material with a lithium or sodium storage capability is limited lithium or sodium ion conductivity and electrical conductivity of the active material itself that can cause a battery cell to have limited cell performance capability (for example, limited maximum cell capacity that is substantially below theoretical capacity). For example, conventional lithium ion batteries have limited cell performance due to limited lithium ion conductivity and limited electrical conductivity of the active material constituting them, such that conventional lithium ion batteries can achieve a maximum cell capacity much less than their theoretical capacity. This problem is particularly acute in solid-state lithium ion batteries due to undesirable interactions between solid-state electrolyte particles and active particles that results in poor cell performance.

Although the limited cell capacity can be remedied to some degree in traditional lithium ion batteries having a porous cathode made of an active material and a conductive carbon material and a liquid-state electrolyte, the limited cell capacity of solid-state lithium ion batteries remains a significant problem because sufficient ion conduction cannot be achieved in these batteries to allow for a useable solid-state battery cell. Conventional solid-state lithium ion batteries suffer from interface resistance between solid-state electrolyte particles and active particles, and this interface resistance results in low cell performance and capacity.

Lithium metal is desirable for use as an anode in secondary batteries because it is the lightest metal (the density of lithium is 0.59 g cm$^{-3}$), because it has a very high theoretical specific capacity (3,820 milliampere per gram (mAh/g)), and because it has the lowest negative electrochemical potential (−3.040 V vs. a standard hydrogen electrode).

Solid-state secondary batteries have certain advantages over liquid-state secondary batteries. For example, liquid-state batteries suffer from potential flammability issues, which in extreme cases can cause a battery cell to explode. In addition, liquid-state secondary batteries suffer from side-reactions which lead to a shorter lifespan of a battery cell (measured in terms of cycles). Because solid-state secondary batteries do not suffer from these same deficiencies, there is a need for a solid-state secondary battery cell that has good lithium ion conductivity to achieve commercially viable cell capacity and performance.

In recent years, some approaches have been pursued in an attempt to reduce interface resistance between the solid-state electrolyte particles and the active particles. For example, Sakuda et al., "All-solid-state lithium secondary batteries using LiCoO$_2$ particles with pulsed laser deposition coatings of Li$_2$S—P$_2$S$_5$ solid electrolytes," Journal of Power Sources 196:6735-6741 (2011), reported that a simple mixing of uncoated LiCoO$_2$ and Li$_2$S—P$_2$S$_5$ ("LSPS") particles in a cathode formed a solid-state cell that failed to cycle. However, when the LiCoO$_2$ particles are coated with a thin film of LiNbO$_3$ or LSPS using pulsed laser deposition and then used to fabricate a cathode of a solid-state cell, the cell cycled. However, the highest capacity extracted was 95 mAh/g out of 140 mAh/g expected from LiCoO$_2$. The cell in Sakuda was a powder compressed cell with coated or uncoated LiCoO$_2$ particles mixed with LSPS particles in the cathode layer, only LSPS particles in the electrolyte layer, and indium-foil as the anode.

As another example, Mari Yamamoto et al., "Binder-free sheet-type all-solid-state batteries with enhanced rate capabilities and high energy densities," Scientific Reports 8, Article number: 1212 (2018), used LiNbO$_3$-coated NMC and a sacrificial binder to fabricate self-sustaining, full all-inorganic solid-state battery cell with a NMC, LSPS, acetylene black-cathode, a LSPS-electrolyte, and a graphite, LSPS, acetylene black anode. The sacrificial binder was eliminated during the post fabrication annealing at 300° C. near the glass transition temperature of LSPS. The LSPS melted to improve the adhesion and interface between the particles. A cell capacity of 155 mAh/g that is much closer to the theoretical capacity of NMC was obtained.

However, these particle coating techniques are expensive and commercially non-viable, among other issues. Additionally, LiNbO$_3$, Li$_2$SiO$_3$, SiO$_2$, and Al$_2$O$_3$ have limited lithium ion conductivity (a conductivity of less than 10$^{-7}$ Siemens per centimeter (S/cm)).

There is therefore a need for an engineered particle that is useable in both liquid-state and solid-state secondary batteries that provides for improved lithium or sodium ion conductivity and reduced interface resistance such that cell performance and cell capacity can be improved in a commercially viable manner. Specifically, there is a need for an engineered particle which facilitates an intimate contact between a lithium energy storage particle and a lithium ion conducting coating to enhance cell performance. While lithium ion conduction pathways are needed, electron conduction pathways are also important for cell performance, and there is also a need to achieve a desired level of intimacy between the electron conduction pathways and the lithium energy storage particle.

Engineered Particle

Referring generally to the figures, an engineered particle for use for example in a secondary battery is disclosed. The engineered particle according to an exemplary embodiment stores alkali ions, has enhanced alkali ion conductivity capability, and enhanced electron conduction capability. In an exemplary embodiment, the alkali ions are lithium ions or sodium ions. An engineered particle can include an active particle configured to store energy equal to or at least 90% of what is theoretically possible. As a more specific example, the active particle is configured to store energy equal to between 90-95% of theoretical energy storage capability. As another specific example, the active particle is configured to store energy equal to about to about 95-99% of theoretical energy storage. As yet another specific example, the active particle is configured to store energy equal to about to more than 99% of theoretical energy storage. In still further embodiments, an engineered particle may store energy equal to less than 90% of the theoretical energy storage.

Referring to FIG. 1, an engineered particle (e.g., engineered composite particle) 100 according to an exemplary embodiment of the present disclosure is shown. The engineered particle 100 includes an active material particle 120 and an alkali ion conducting coating (e.g., conductive coating) 160 disposed around an outer surface of the active material particle. The engineered particle 100 also includes electrically conductive carbon nano-particles 140 disposed within the conductive coating 160. In some embodiments, the alkali is lithium or sodium.

According to some aspects, the active material particle 120 of the engineered particle 100 has lithium or sodium ion storage capability, for example, the active material particle 120 includes either or both of a lithium intercalating material and sodium intercalating material. For example, in the case in which the active material particle 120 includes a lithium intercalating material, the active material particle may be formed of any one of the following compounds: LiCoO$_2$, LiNiCoAlO$_2$, LiNiMnCoO$_2$, LiFePO$_4$, LiMnO$_2$, sulfur, silicon nanoparticle, SiO$_2$ (such as porous SiO$_2$), SnO$_2$, Li$_4$Ti$_5$O$_{12}$, graphite, graphene oxide, or activated carbon. As another example, in the case in which the active material particle 120 includes a sodium intercalating material, the active material particle 120 may include NaCoO$_2$, NaNiCoAlO$_2$, NaNiMnCoO$_2$, NaFePO$_4$, NaMnO$_2$, SnO$_2$, Na$_4$Ti$_5$O$_{12}$, sulfur, graphite, graphene oxide, or activated carbon.

As another example, the active material particle 120 of the engineered particle 100 includes a non-lithium intercalating material or a non-sodium intercalating material. As specific examples, the active material particle 120 of the engineered particle 100 may include an intercalating material comprised of graphite, activated carbon, graphene oxide, sulfur, SiO$_2$ (such as porous SiO$_2$), or SnO$_2$.

The active material particle 120 may have any suitable size. As one example, the active material particle 120 has a size of less than 1 μm. As another example, the active material particle 120 has a size of between about 0.01 μm and about 50 μm. As a specific example, the active material particle has a size of about 0.01 μm.

Figure 3:
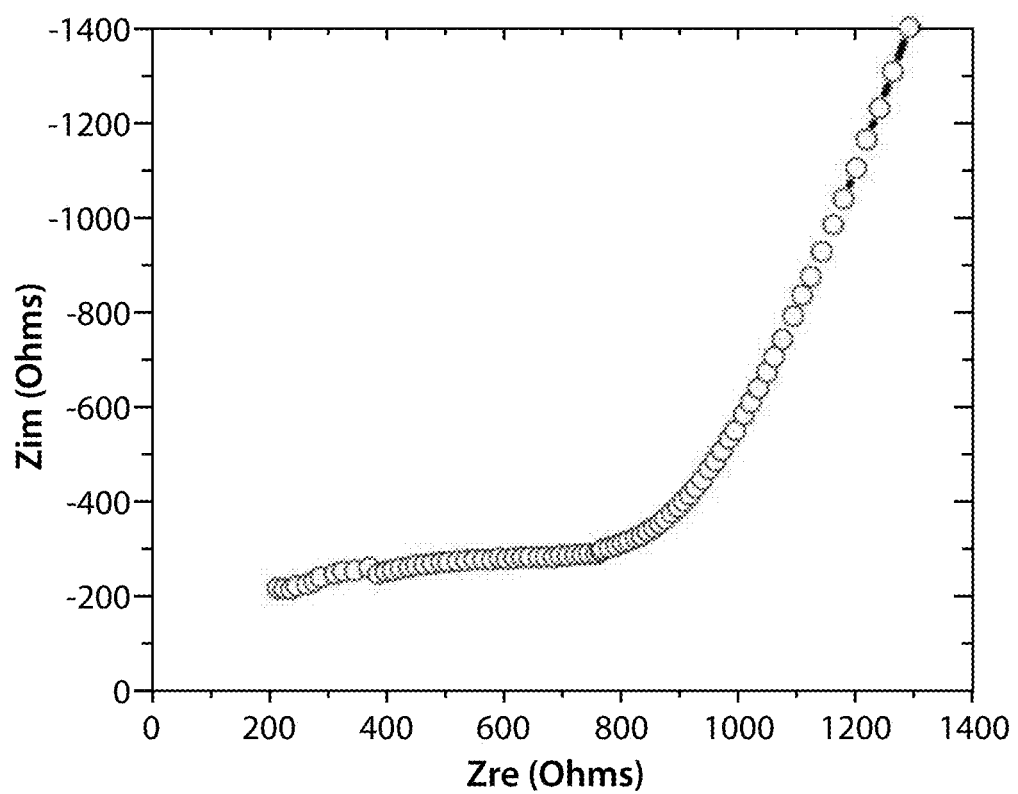
FIG. 3 is a Nyquist plot of the conductive film illustrated in FIGS. 2A and 2B according to an illustrative embodiment.

Referring back to FIG. 1, the conductive coating 160 includes a M$_x$Al$_y$Si$_z$O$_w$ film disposed on the outer surface of the active material particle 120 wherein 1≤x≤4, 0≤y≤1, $1 \leq z \leq 2$, and $3 \leq w \leq 6$, where M is an alkali metal. In some embodiments, M is lithium, and the conductive coating includes a $Li_xAl_ySi_zO_w$ film. In some embodiments, M is sodium, and the conductive coating includes a $Na_xAl_ySi_zO_w$ film. The $M_xAl_ySi_zO_w$ film can have any desired thickness. For example, the $M_xAl_ySi_zO_w$ film can have a thickness of 0.01 μm to 0.1 μm. A $Li_xAl_ySi_zO_w$ film according to an exemplary embodiment has a lithium ion conductivity of about $10^{-5}$ S/cm, as can be appreciated from FIG. 3.

According to some aspects, the conductive coating 160 can be characterized by depositing the film on platinum or gold coated Si substrate, serving as bottom contact, and another platinum or gold top contact deposited on the $M_xAl_ySi_zO_w$ film.

Figure 2A:
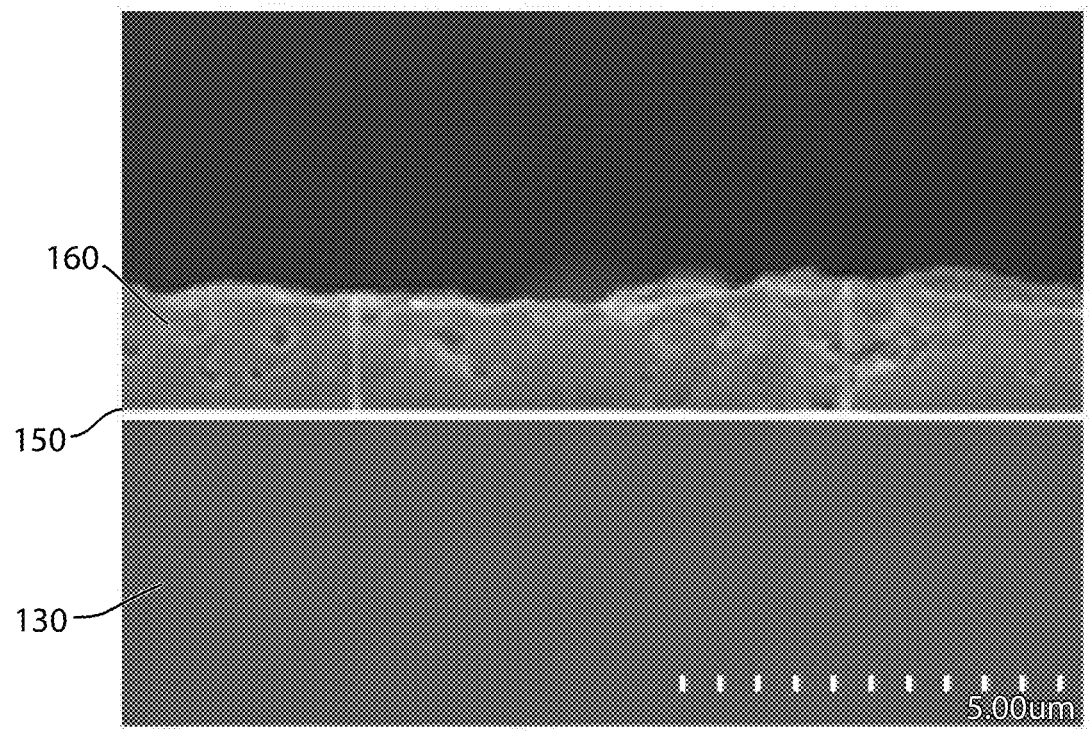
FIG. 2A is a side cross-sectional view of a scanning electron microscope ("SEM") images depicting a conductive film deposited on a silicon substrate to characterize the conductive coating of the engineered particle illustrated in FIG. 1 according to an illustrative embodiment.
Figure 2B:
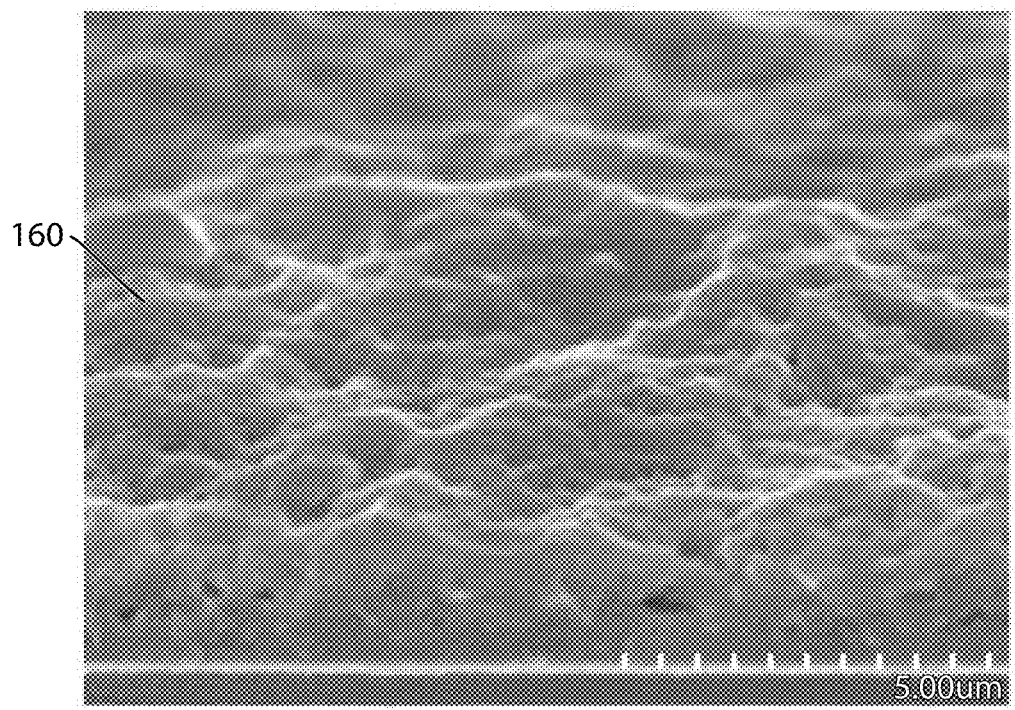
FIG. 2B is a top perspective view of a SEM image depicting the conductive film illustrated in FIG. 2A according to an illustrative embodiment.

As can be appreciated from both FIGS. 2A and 2B, showing a $Li_xAl_ySi_zO_w$ film according to an exemplary embodiment, a $M_xAl_ySi_zO_w$ film is amorphous, having no crystal with grain boundaries that could block easy flow of ions. The conductive coating 160 as presently described is useable in a wide range of surface variability of the active particle because the conductive coating 160 takes the shape of the active material particle 120 it is coating.

Referring again to FIG. 1, the electrically conductive carbon nano-particles 140 are disposed (e.g., embedded) within the conductive coating 160. The electrically conductive carbon nano-particles 140 can be any carbon nano-particle that allows for electron conductivity (for example, conductive carbon black particles (Super P), graphene, or carbon nanotube). As one example, the carbon nano-particles have a conductivity within a range of between about 3 S/cm to about 100 S/cm.

The engineered particle 100 according to an exemplary embodiment is useable in many different applications, such as in different types of secondary batteries. Because lithium cannot be transformed into an engineered particle (due to lithium's melting temperature of around 160° C.), the lithium metal can be protected with the engineered particle 100 to render the lithium suitable for use in a secondary battery component. On the other hand, graphite can be transformed into an engineered particle because its melting temperature is above 1000° C. Additionally, the engineered particle 100 is useable in different applications in secondary batteries or supercapacitors, for example, in either a cathode or an anode or both, as is further described herein. It is to be understood that the applications described herein are not limiting but are merely exemplary uses for the engineered particle 100 herein disclosed and described.

Method of Fabricating an Engineered Particle

Figure 8:
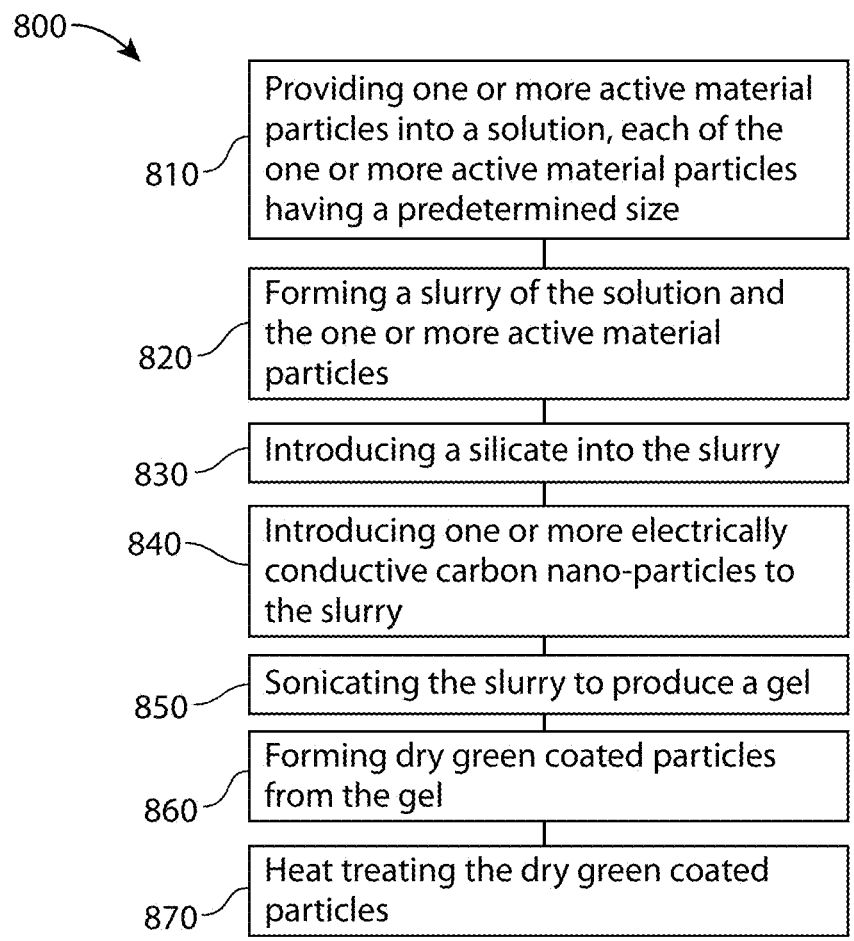
FIG. 8 is a flowchart illustrating a method of fabricating an engineered particle according to an illustrative embodiment.

Referring now to FIG. 8, a method 800 of fabricating or manufacturing an engineered particle according to an exemplary embodiment of the present disclosure is shown. The method 800 includes the step 810 of providing one or more active material particles into a solution, each of the one or more active material particles having a predetermined size. According to one aspect, the predetermined size is within the range of about 0.01 μm and about 50 though other sizes may also be used. The predetermined size of the one or more active material particles can be achieved using any suitable process, for example, by ball milling the one or more active material particles. The solution can be any suitable solution, for example, an aqueous solution including an alkali salt and an aluminum salt dissolved in deionized water. In some embodiments, the solution includes $LiNO_3$ and $Al(NO_3)_3$ dissolved in deionized water. In some embodiments, the solution includes $NaNO_3$ and $Al(NO_3)_3$ dissolved in deionized water.

The method 800 also includes the step 820 of forming a slurry of the solution and the one or more active material particles. The forming of the slurry can include boiling the solution. The method 800 also includes the step 830 of introducing a silicate (for example, a water soluble alkali silicate) into the slurry. In some embodiments, the silicate is a diluted lithium silicate or a diluted sodium silicate. The method 800 also includes the step 840 of introducing one or more electrically conductive carbon nano-particles to the slurry. The carbon nano-particles can be, for example, conductive carbon black particles (Super P), graphene particles, or carbon nanotubes. The method 800 also includes the step 850 of sonicating the slurry to produce a gel. The gel can be optionally diluted with deionized water. The method 800 also includes the step 860 of forming dry green coated particles from the gel by, for example, transferring the gel to a spray atomizer machine and atomizing the gel to produce the dry green coated particles. The method 800 also includes the step 870 of heat treating the dry green coated particles to produce the engineered particle illustrated in FIG. 1.

According to some aspects of the method 800, the step 870 of heat treating the dry green coated particles includes curing at a curing temperature of about 300° C. and annealing at an annealing temperature within a range of 400 to 600° C. in the presence of an ambient gas, for example, nitrogen or argon gas.

Fabrication of Cathode for a Liquid-State Alkali Ion Battery

The engineered particle 100 described above can be used in fabricating an electrode for use in a liquid-state alkali ion battery.

Figure 4:
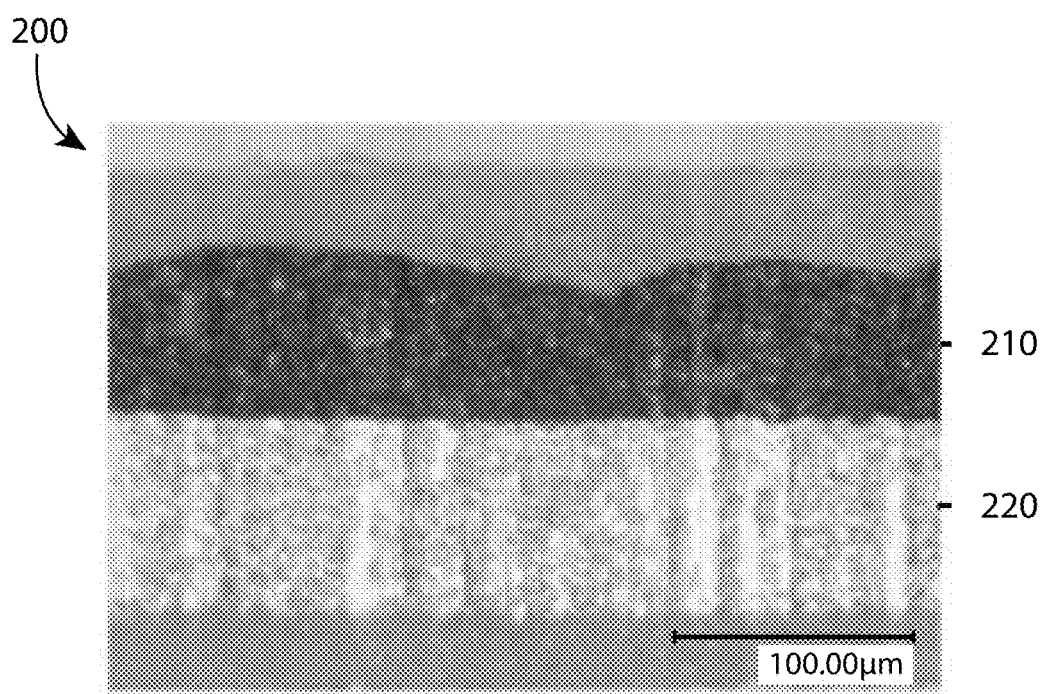
FIG. 4 is a side cross-sectional view of a lithium ion battery cathode including the engineered particle illustrated in FIG. 1 according to an illustrative embodiment.

As one example, referring to FIG. 4, a cathode 200 of a lithium alkali ion battery includes an engineered alkali-intercalating composite material (e.g. $LiCoO_2$) including one or more of the engineered particle 100 of the present disclosure. The cathode 200 also includes a metal substrate 220. In some embodiments, the substrate is an aluminum substrate. FIG. 4 shows the cross-sectional SEM image of an engineered $LiCoO_2$ cathode post-processing, according to an exemplary embodiment.

In some embodiments, a slurry is formed by blending engineered particles, conductive particles, an organic binder, and a non-aqueous solvent. In cathode 200, a slurry according to an exemplary embodiment is formed as follows: starting with 90% engineered particle, 5% conductive carbon black particles (Super P), and 5% PVDF (polyvinylidene fluoride or polyvinylidene difluoride) by weight, every 1 g of PVDF is first dissolved in 12 mL of tetrahydrofuran; then every 2 g of total initial solids require 12 mL of a non-aqueous solvent, preferably methoxy propanol, N-methyl pyrrolidone, dimethylformamide, or dimethyl sulfoxide. These are then mixed together to form the slurry. In some embodiments, other mixtures may be used and the slurry may also include one or more other particles or other ingredients. The coating of the metal substrate by the slurry can be done by spray coating, or slot coating. In some embodiments, coating includes heating the substrate between 80 and 200° C. in air. In some embodiments, for slot coating, no further dilution of the slurry is needed. However, for spray coating the slurry is further diluted to prevent the spray nozzle from getting clogged, preferably increasing the amount of the non-aqueous solvent to a range of about 25 to 50 mL per 2 g of solids. After coating and baking, the coated aluminum substrate is calendared at about 10-100 tons (for example, at 24 tons, as illustrated in FIG. 4). In some embodiments, calendaring is done at about 20-40 tons. The coated substrate is then cured at 300° C. in nitrogen ambient. In some embodiments, the coated substrate is cured for 10 to 30 minutes. The cathode 200 is useable in lithium or sodium ion battery cells, in either liquid-state or solid-state lithium or sodium ion batteries.

Fabrication of Cathode for a Solid-State Lithium Ion Battery

The engineered particle 100 described above can be used in fabricating an electrode for us in a solid-state lithium ion battery.

As one example, the composite cathode for a solid-state lithium ion battery includes 85% engineered particle, 5 to 10% inorganic solid-state electrolyte nano-particles, and 5% carbon black particles (Super P), though other percentages may be used in other embodiments. Mixed powder forming the composite material can be deposited by aerosol deposition on appropriate current collector if a particle size is between 200 nm to 2 µm to form a dense film. LIPON solid-state electrolyte deposition can be accomplished via sputtering, and lithium anode deposition via evaporation to complete the solid-state lithium ion battery cell.

The electrolyte deposited on the cathode may also be SPEED deposited LiAlGaSPO, according to the deposition processes disclosed in either U.S. Pat. Nos. 8,349,498 and 8,372,163, both of which are incorporated herein by reference in their entireties for all purposes.

Fabrication of Stabilized Anode for a Lithium Ion Battery

As mentioned above, lithium is desirable for use in secondary batteries as an anode because of its light weight and its high specific capacity. These properties allow batteries to achieve high specific energy density (more than 200 Wh/kg). The lithium metal anode can be used with any suitable cathode material, including cathodes formed with lithium containing compounds, such as $LiCoO_2$, $LiFePO_4$, etc., and cathodes formed with non-lithium containing compounds (for example, sulfur cathodes). However, the potential for a lithium anode is limited by the destructive interaction with liquid or polymer electrolyte leading to solid electrolyte interphase ("SEI") layer formation and buildup. Use of the engineered particle 100 herein described in a lithium metal anode can reduce or eliminate the destructive interaction in a lithium ion battery cell. In one example, the engineered particle includes a lithium-intercalating material such as a lithium aluminosilicate.

Figure 5A:
FIGS. 5A to 5C depict fabrication steps for fabricating a lithium metal anode including the engineered particle illustrated in FIG. 1 according to an illustrative embodiment.
Figure 5B:
Figure 5C:
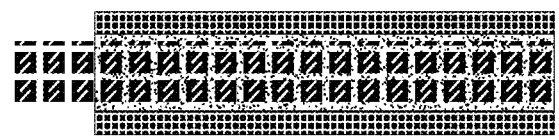

Referring now to FIG. 5, a process 300 for fabricating a stabilized lithium anode using the engineered particle 100 according to an exemplary embodiment is shown. The process 300 includes step 310 of providing a metal current collector. In some embodiments, the current collector is a mesh or foil. In some embodiments, the metal current collector is copper, nickel, or stainless steel. The process 300 also includes step 320 of laminating the metal current collector with a very thin lithium metal foil. Alternatively, the lithium metal can also be evaporated on to the metal current collector. The flexibility of the resulting anode is determined by the thickness of the starting metal current collector (e.g., 10 µm to 100 µm) and the thickness of the lithium laminate (e.g., 5 µm to 50 µm). The process 300 also includes the step 340 of spray coating the lithium laminated current collector with a slurry of engineered particles and curing at temperature ranging, for example, from 100 to 300° C. The engineered particles can be, for example, $SnO_2$ engineered particles, $Li_4Ti_5O_{12}$ engineered particles, graphene oxide engineered particles, or $SiO_2$ engineered particles. Alternatively, the engineered particle can be an active material particle comprising a conductive coating, for example, an alkali-intercalating material having a conductive coating including an alkali aluminosilicate and carbon nanoparticles. The slurry can also include hexane, polyisobutylene (PIB) dispersant, engineered particles, and carbon black (Super P conductive carbon). Alternatively, either toluene or benzene can be used instead of hexane. In some embodiments, the solid content of the slurry is 80 to 90% engineered particles, 5 to 10% Super carbon black, and 5 to 10% PIB. For 2 g solid 25 mL to 50 mL of hexane, toluene, benzene is used.

Figure 6A:
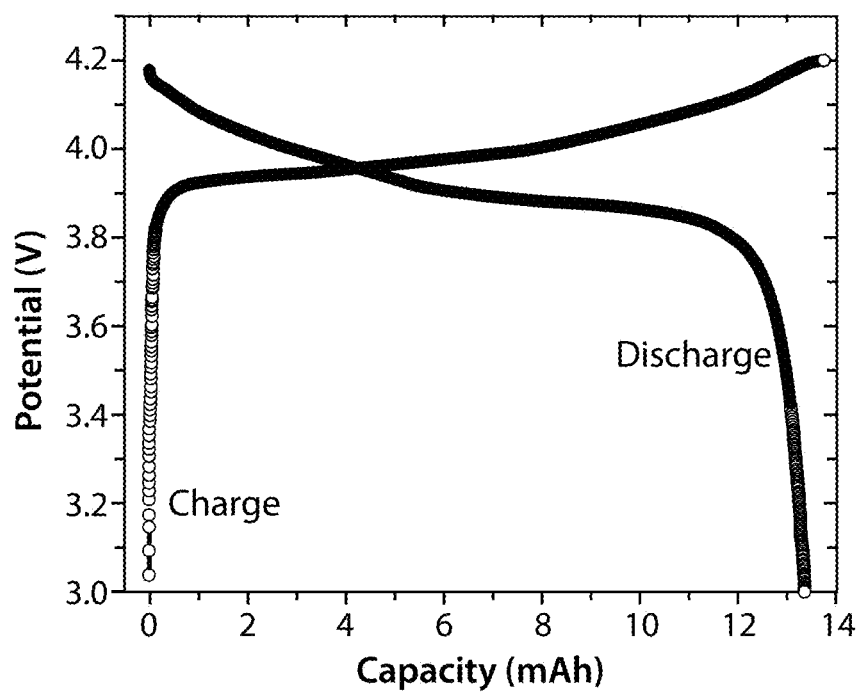
FIG. 6A is a graph showing a charge/discharge voltage profile of a lithium ion battery cell including a cathode which includes the engineered particle illustrated in FIG. 1 and an anode which includes the engineered particle illustrated in FIG. 1 according to an illustrative embodiment.
Figure 6B:
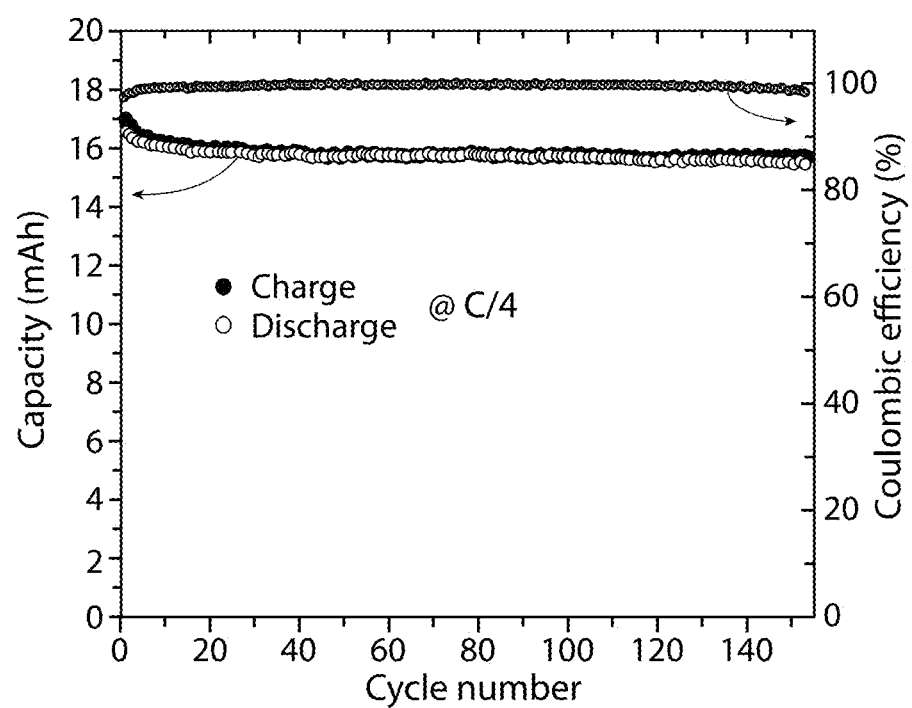
FIG. 6B is a graph showing cell capacity as a function of number of cycles and calculated cycling efficiency for the lithium ion battery cell according to an illustrative embodiment.

As an example, an engineered $LiCoO_2$ composite cathode as described herein can be paired with a lithium stabilized anode with a $LiPF_6$ liquid electrolyte cell with a celgard separator. As shown in FIG. 6A, the battery cell exhibits an excellent $LiCoO_2$ charge/discharge voltage profile. Also, as shown in FIG. 6B, when the battery cell stabilizes after about 20 cycles, the cell can cycle for more than 150 cycles with less than 2% capacity fade.

Water-Based Lithium or Sodium Batteries or Capacitors

As another example, an engineered particle 100 according to an exemplary embodiment is also useable in water-based lithium or sodium secondary batteries.

For example, a composite cathode can include either an engineered $LiMnO_2$ particle or an $NaMnO_2$ particle, along with conductive carbon particles, carbon nanotubes, and PVDF binder, when paired with a composite anode including one of engineered activated carbon, graphite, conductive carbon particles, carbon nanotubes, graphene, and graphene oxide combined with PVDF binder to form a water-based batteries or capacitors. For example, at least one of the anode and cathode includes an engineered particle comprising an active material particle comprising a conductive coating, for example, an alkali-intercalating material having a conductive coating including a $M_xAl_ySi_zO_w$ film and carbon nanoparticles. In some embodiments, M is lithium and conductive coating includes a $Li_xAl_ySi_zO_w$ film. In some embodiments, M is sodium and conductive coating includes a $Na_xAl_ySi_zO_w$ film.

Figure 7A:
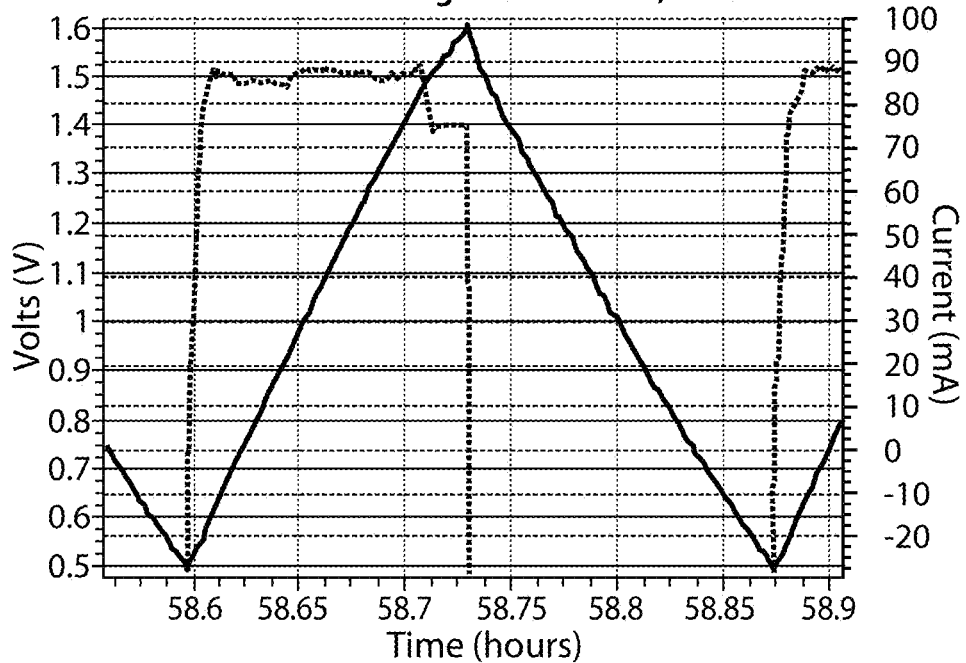
FIG. 7A is a graph showing a charge/discharge voltage profile of a water battery cell including a cathode which includes the engineered particle illustrated in FIG. 1 and an anode which includes the engineered particle illustrated in FIG. 1 according to an illustrative embodiment.
Figure 7B:
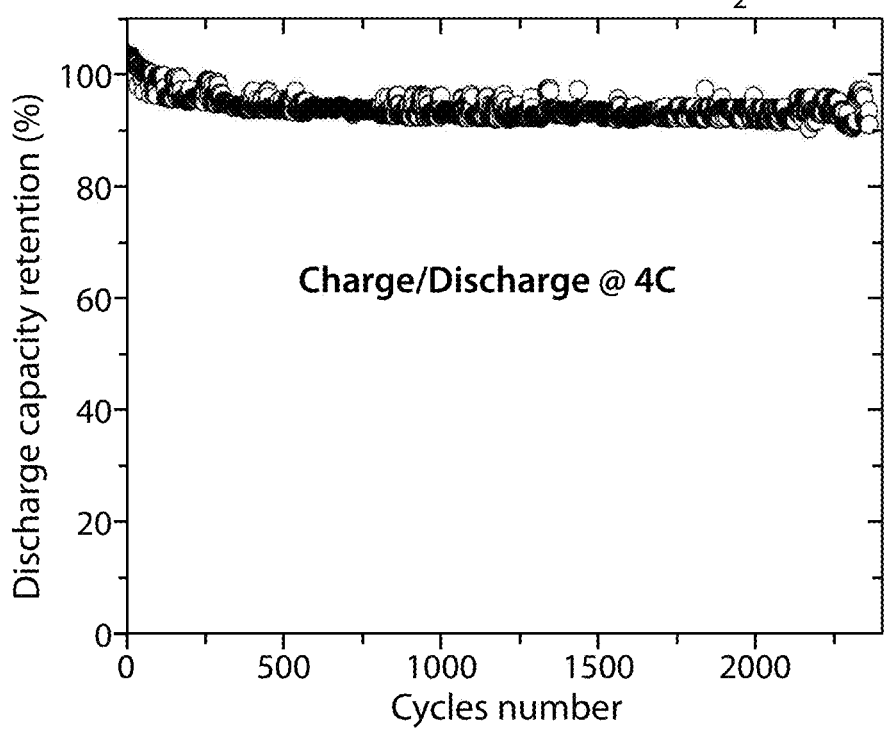
FIG. 7B is a graph showing cell discharge capacity as a function of number of cycles for the water battery cell according to an illustrative embodiment.

The electrolytes in these water-based battery cells include aqueous electrolytes. In some embodiments the electrolytes include deionized water solvent with $LiNO_3$, $Li_2SO_4$, $NaNO_3$, or $Na_2SO_4$. The separator in these water-based battery cells can, for example, be cotton cloth, though one or more other materials may also be used. As shown in FIG. 7A, an engineered $NaMnO_2$ cathode/engineered activated anode of a water-based battery cell exhibits an excellent charge/discharge voltage profile. Also, FIG. 7B shows that the water-based battery cell has a lifespan of more than 2500 cycles at charge/discharge duration of 15 minutes, with more than 95% capacity retention. In the example shown in FIG. 7, the cathode material comprises engineered $NaMnO_2$, the anode comprises engineered activated carbon, the electrolyte comprises a $Na_2SO_4$ solution, and the engineered particle comprises a coating of $Na_xAl_ySi_zO_w$.

Non-Aqueous Lithium or Sodium Batteries or Capacitors

As another example, an engineered particle 100 according to an exemplary embodiment is also useable in non-aqueous lithium or sodium secondary batteries.

For example, a composite cathode can include either an engineered $LiNiMnCoO_2$ particle or an $NaFePO_4$ particle, along with conductive carbon particles, carbon nanotubes, and PVDF binder, when paired with a composite anode including one of engineered graphite, activated carbon, conductive carbon particles, graphene oxide, graphene, and carbon nanotubes, combined with PVDF binder to form a non-aqueous batteries or capacitors. Alternatively, the composite anode can include Li or Na foil protected by particulate material selected from $SnO_2$, $Li_4Ti_5O_{12}$, graphite, or $SiO_2$. For example, at least one of the anode and cathode includes an engineered particle comprising an active material particle comprising a conductive coating, for example, an alkali-intercalating material having a conductive coating including a $M_xAl_ySi_zO_w$ film and carbon nanoparticles. In some embodiments, M is lithium and conductive coating includes a $Li_xAl_ySi_zO_w$ film. In some embodiments, M is sodium and conductive coating includes a $Na_xAl_ySi_zO_w$ film. In some embodiments, the separator is a porous polymeric membrane such as polyethylene, polypropylene, polyimide, or cellulose.

The electrolytes in these battery cells include non-aqueous electrolytes. In some embodiments the electrolytes include one of $LiPF_6$, $NaPF_6$, LiFSI, and NaFSI, dissolved in ethyl carbonate/ethyl methyl carbonate. In some embodiments, the electrolytes include ionic liquids.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Likewise, where multiple method steps are described, one or more steps may optionally be omitted. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus, system, device, or chemical composition, etc. as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An engineered particle for an energy storage device, the engineered particle comprising:
    an active material particle comprising an outer surface, the active material particle comprising an intercalating material selected from the group consisting of a lithium-containing intercalating material, a sodium-containing intercalating material, graphite, $SiO_2$, $SnO_2$, sulfur, graphene oxide, activated carbon, and a combination thereof;
    an alkali ion conductive coating disposed on the outer surface of the active material particle; and
    at least one carbon particle disposed within the alkali ion conductive coating,
    wherein the alkali ion conductive coating conducts an alkali ion selected from the group consisting of a Na ion and a Li ion.

2. The engineered particle according to claim 1, wherein the alkali ion conductive coating has an alkali ion conductivity of about $10^{-5}$ S/cm.

3. The engineered particle according to claim 1, wherein the alkali ion conductive coating is amorphous.

4. The engineered particle according to claim 1, wherein the active material particle has a size within a range of about 0.01 μm to about 50 μm.

5. The engineered particle according to claim 1, wherein the active material particle comprises a lithium intercalating material.

6. The engineered particle according to claim 1, wherein the active material particle comprises at least one material selected from the group consisting of:
    a lithium-containing intercalating material selected from the group consisting of $LiCoO_2$, $LiNiCoAlO_2$, $LiNiMnCoO_2$, $LiFePO_4$, and $LiMnO_2$, $Li_4Ti_5O_{12}$.

7. The engineered particle according to claim 1, wherein the active material particle comprises a sodium intercalating material.

8. The engineered particle according to claim 1, wherein the active material particle comprises at least one material selected from the group consisting of: a sodium-containing intercalating material selected from the group consisting of $NaCoO_2$, $NaNiCoAlO_2$, $NaNiMnCoO_2$, $NaFePO_4$, $NaMnO_2$, and $Na_4Ti_5O_{12}$.

9. The engineered particle according to claim 1, wherein the active material particle comprises at least one material selected from the group consisting of: a non-sodium or non-lithium containing material selected from the group consisting of graphite, sulfur, activated carbon, graphene oxide, $SiO_2$, or $SnO_2$.

10. The engineered particle according to claim 1, wherein the alkali ion conductive coating comprises a $M_xAl_ySi_zO_w$ film; wherein M is an alkali selected from the group consisting of Na and Li, and $1 \leq x \leq 4$, $0 \leq y \leq 1$, $1 \leq z \leq 2$, and $3 \leq w \leq 6$.

11. The engineered particle according to claim 10, wherein the alkali is Na.

12. A secondary battery comprising:
    a cathode;
    an anode; and an electrolyte,
wherein at least one of the cathode and the anode comprises the engineered particle of claim 1.

13. The secondary battery of claim 12, wherein the alkali ion conductive coating is amorphous.

14. The secondary battery of claim 12, wherein the active material particle comprises at least one material selected from the group consisting of: a lithium-containing intercalating material selected from the group consisting of $LiCoO_2$, $LiNiCoAlO_2$, $LiNiMnCoO_2$, $LiFePO_4$, $LiMnO_2$, and $Li_4Ti_5O_{12}$.

15. The secondary battery of claim 12, wherein the active material particle comprises at least one material selected from the group consisting of:
a sodium-containing intercalating material selected from the group consisting of $NaCoO_2$, $NaNiCoAlO_2$, $NaNiMnCoO_2$, $NaFePO_4$, $NaMnO_2$, and $Na_4Ti_5O_{12}$.

16. The secondary battery of claim 12, wherein the alkali ion conductive coating comprises a $M_xAl_ySi_zO_w$ film; wherein M is an alkali selected from the group consisting of Na and Li, and $1 \leq x \leq 4$, $0 \leq y \leq 1$, $1 \leq z \leq 2$, and $3 \leq w \leq 6$.

17. The secondary battery of claim 16, wherein the alkali is Li.

18. The secondary battery of claim 12, wherein the active material particle comprises at least one material selected from the group consisting of: a non-sodium or non-lithium containing material selected from the group consisting of graphite, sulfur, activated carbon, graphene oxide, $SiO_2$, or $SnO_2$.

19. An alkali-ion energy storage device comprising:
a cathode;
an anode;
a separator; and
an aqueous electrolyte,
wherein at least one of the cathode and the anode comprises the engineered particle of claim 1.

20. The energy storage device of claim 19,
wherein the cathode comprises:
a first particulate material selected from the group consisting of $NaMnO_2$ and $LiMnO_2$;
a second particulate material selected from the group consisting of conductive carbon particles and carbon nanotubes; and
PVDF binder;
wherein the anode comprises:
a third particulate material selected from the group consisting of activated carbon, graphene oxide, conductive carbon particles, and carbon nanotubes; and
PVDF binder;
wherein the separator comprises a cotton cloth; and
wherein the aqueous electrolyte comprises a solution of at least one species selected from the group consisting of $LiNO_3$, $Li_2SO_4$, $NaNO_3$, and $Na_2SO_4$.

21. The energy storage device of claim 19, wherein the device is selected from a group consisting of a battery and a capacitor.

22. The energy storage device of claim 19, wherein the active material particle comprises at least one material selected from the group consisting of: a lithium-containing intercalating material selected from the group consisting of $LiCoO_2$, $LiNiCoAlO_2$, $LiNiMnCoO_2$, $LiFePO_4$, $LiMnO_2$, and $Li_4Ti_5O_{12}$.

23. The energy storage device of claim 19, wherein the active material particle comprises at least one material selected from the group consisting of:
a sodium-containing intercalating material selected from the group consisting of $NaCoO_2$, $NaNiCoAlO_2$, $NaNiMnCoO_2$, $NaFePO_4$, $NaMnO_2$, and $Na_4Ti_5O_{12}$.

24. The energy storage device of claim 19, wherein the alkali ion conductive coating comprises a $M_xAl_ySi_zO_w$ film; wherein M is an alkali selected from the group consisting of Na and Li, and $1 \leq x \leq 4$, $0 \leq y \leq 1$, $1 \leq z \leq 2$, and $3 \leq w \leq 6$.

25. The energy storage device of claim 19, wherein the active material particle comprises at least one material selected from the group consisting of: a non-sodium or non-lithium containing material selected from the group consisting of graphite, sulfur, activated carbon, graphene oxide, $SiO_2$, and $SnO_2$.

26. A method of fabricating a cathode for an alkali-ion battery, comprising the steps of:
a) forming coated particles by:
forming particles of an alkali-intercalating material, the alkali-intercalating material comprising an intercalating material selected from the group consisting of a lithium-containing intercalating material, a sodium-containing intercalating material, graphite, $SiO_2$, $SnO_2$, sulfur, graphene oxide, activated carbon, and a combination thereof;
mixing the particles of the alkali-intercalating material with an aqueous solution comprising an aluminum salt and an alkali metal salt to form a first slurry;
adding a water-soluble alkali silicate into the first slurry;
adding electrically-conductive carbon nanoparticles into the first slurry;
sonicating the first slurry to produce a gel;
drying the first gel to form individual dry green coated gel particles; and,
heat treating the green coated gel particles to produce coated particles comprising the particles of the alkali-intercalating material, an alkali ion conductive coating comprising an alkali aluminosilicate, wherein the alkali ion conductive coating conducts an alkali ion selected from the group consisting of a Na ion and an Li ion, and carbon nanoparticles disposed within the alkali ion conductive coating;
b) blending the coated particles with conductive particles, an organic binder, and at least one non-aqueous solvent to form a second slurry;
c) applying a coating of the second slurry to a metal substrate with the substrate heated between 80 and 200° C. in air;
d) calendaring the coated substrate at 10 tons or greater; and
e) curing the coated substrate in nitrogen at 250 to 400° C.

27. The method of claim 26, wherein the alkali ion conductive coating comprises a $M_xAl_ySi_zO_w$ film and at least one particulate material selected from the group consisting of: a carbon particle, a graphene particle, and a carbon nanotube particle, the particulate material disposed within the alkali ion conductive coating, and wherein M is an alkali selected from the group consisting of Na and Li, and $1 \leq x \leq 4$, $0 \leq y \leq 1$, $1 \leq z \leq 2$, and $3 \leq w \leq 6$.

28. The method of claim 26, wherein the aqueous solution comprises $Al(NO_3)_3$ and at least one salt selected from the group consisting of $LiNO_3$ and $NaNO_3$.

29. The method of claim 26, wherein the water-soluble alkali silicate is selected from the group consisting of a lithium silicate solution and a sodium silicate solution.

30. The method of claim 26, wherein the electrically-conductive carbon nanoparticles are selected from the group consisting of carbon black, graphene, carbon nanotubes, and combinations thereof.

31. The method of claim 26, wherein the step of heat treating the green coated particles comprises curing at about 300° C. followed by annealing at 400 to 600° C. in an atmosphere selected from the group consisting of nitrogen, argon gas, and combinations thereof.

32. The method of claim 26, wherein applying the coating comprises a slot coating method.

33. The method of claim 26, wherein applying the coating comprises a spray coating method and the second slurry comprises 25 to 50 mL of at least one non-aqueous solvent per 2 g of solids.

* * * * *